United States Patent [19]

Peviani

[11] Patent Number: 4,820,901
[45] Date of Patent: Apr. 11, 1989

[54] QUICK RELEASABLE GROUND AND ROD CLAMP FOR WELDING

[76] Inventor: Thomas.P. Peviani, 16550 Bushard St., Fountain Valley, Calif. 92708

[21] Appl. No.: 153,088

[22] Filed: Feb. 8, 1988

[51] Int. Cl.⁴ .......................... B23K 9/28; B23K 9/32
[52] U.S. Cl. .................................... 219/138; 81/368; 219/136; 439/92; 439/269; 439/437
[58] Field of Search .............. 219/138, 136, 140, 141; 81/367, 368, 418; 339/238, 266 G

[56] References Cited

U.S. PATENT DOCUMENTS

| | | | |
|---|---|---|---|
| 544,268 | 0/1895 | Unsinger et al. | 81/420 |
| 2,500,590 | 3/1950 | Ward et al. | 81/377 |
| 2,630,729 | 3/1953 | Arner | 81/13 |
| 2,818,495 | 12/1957 | Zoethout et al. | 219/138 |
| 2,873,357 | 2/1959 | Landis | 219/138 |
| 3,188,602 | 6/1965 | Toedtman | 81/52 |
| 3,234,497 | 2/1966 | Condry | 81/367 |
| 3,840,843 | 10/1974 | Izraele | 339/266 |
| 3,988,051 | 0/0000 | Robinson | 339/238 |
| 4,386,542 | 6/1983 | Verna | 81/420 |
| 4,541,312 | 9/1985 | Petersen | 81/367 |

Primary Examiner—Clifford C. Shaw
Attorney, Agent, or Firm—William H. Maxwell

[57] ABSTRACT

A quick releasable clamp for welder's ground and rod connections, characterized by a thumb operable release lever releasing an adjustable toggle link, wherein the opposed jaws have toothed engagement buried into a work piece clamped by extended lever arms having resilience for reserved clamping energy, and alternately wherein the opposed arms have wedging action to position a rod normal to the disposition of the clamp, and wherein the cable conductor is anchored remote from its terminal electrical fitting to the frame of the clamp.

20 Claims, 2 Drawing Sheets

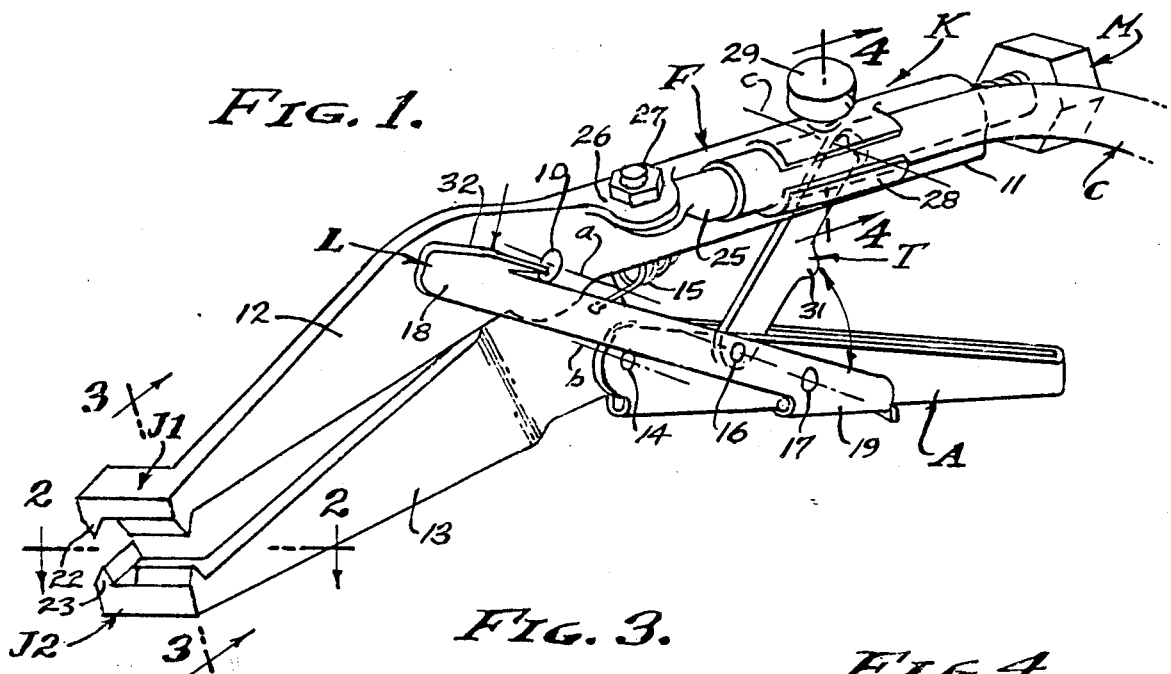
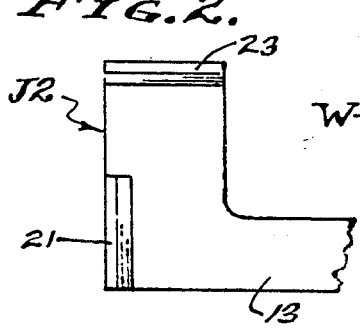
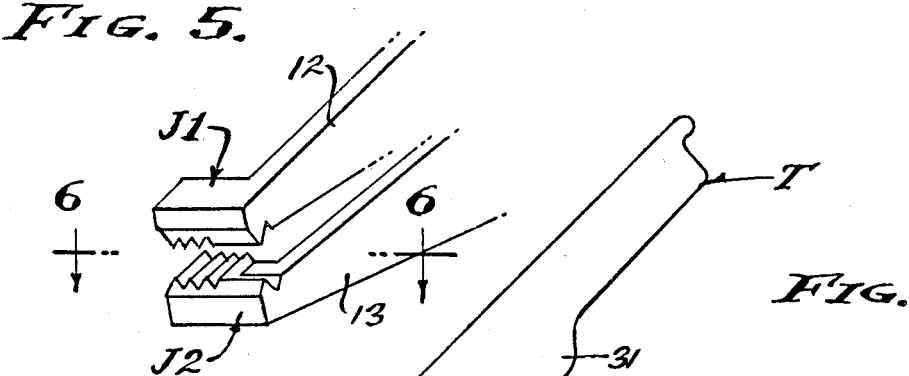
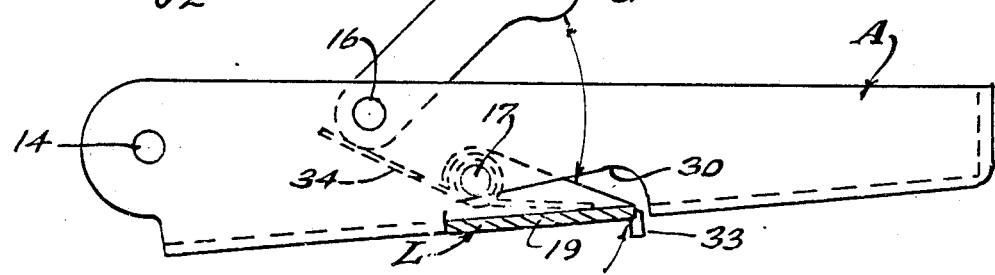

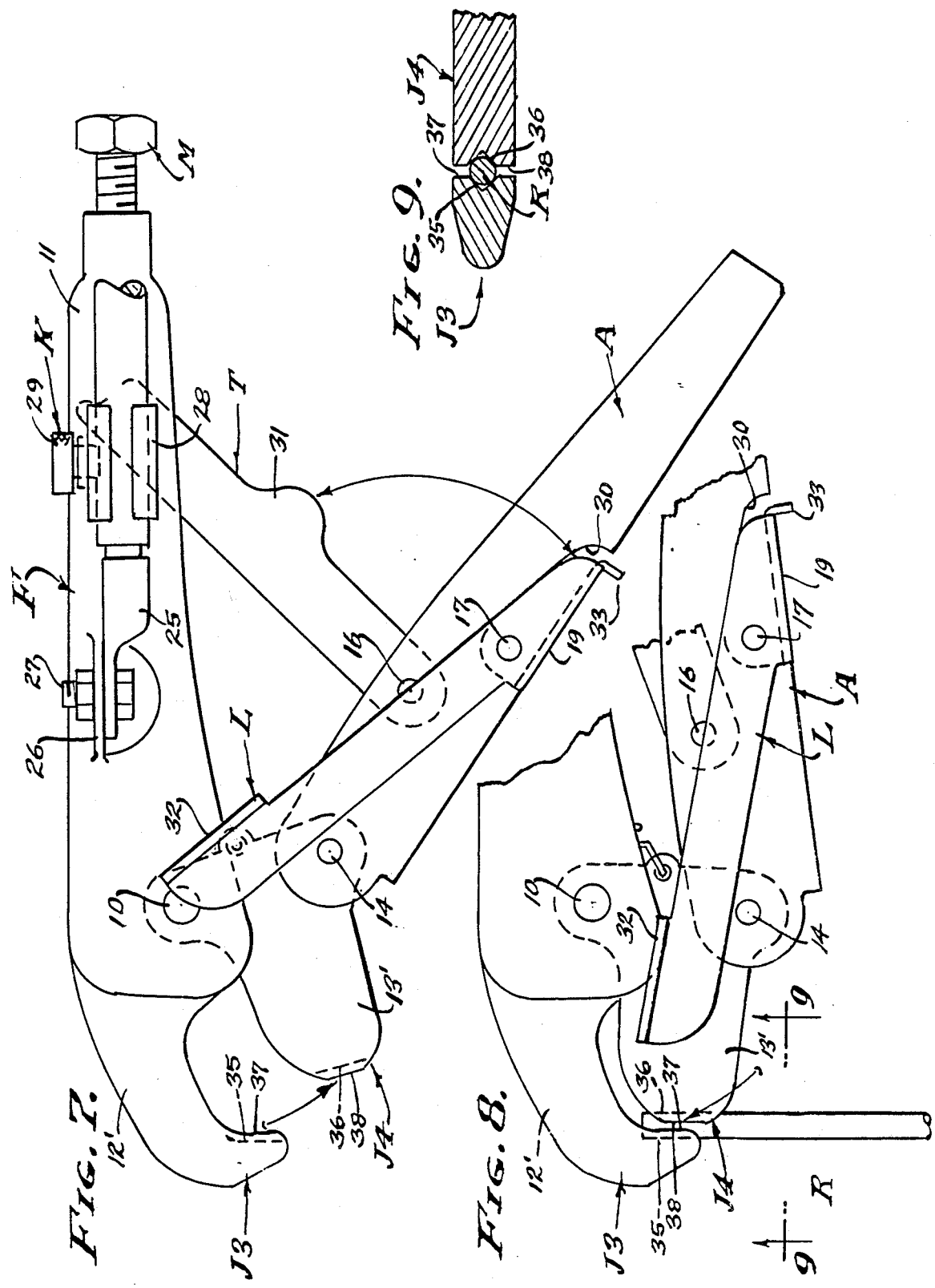

QUICK RELEASABLE GROUND AND ROD CLAMP FOR WELDING

BACKGROUND OF THE INVENTION

This invention relates to the securement of grounds and electrodes as they are used in the process of electric welding. In order to establish a proper electrical discharge from a welding rod and into a work piece, the work piece and rod or electrode must be well connected to the electrical energy source, and such connections are usually established by spring clamps and the like. However, spring biased clamps are not altogether satisfactory, since the springs often weaken and the spring pressure in conjunction with the dulling of the clamp jaws and/or teeth often results in a poor electrical contact, or lack of electrical continuity. In order to increase clamping pressures, "Vice-Grip" pliers have been employed so that the clamp teeth can be operated to bear into the work piece. Nevertheless, due to lack of pressure, dullness of the clamp teeth and because of scale such as oxides and the like, adequate connection remains a problem. This continuity problem is commonly sought to be corrected by striking the clamp jaws with a hammer in order to bury them into the work piece or onto the rod. It is a general object of this invention to provide a welder's grounding and rod clamp which has adequate pressure and ensures electrical continuity and which seldom if ever requires to be struck with a hammer or the like. It is obvious that hammering is detrimental, as it is not only time consuming but can be damaging to the work piece or rod and to the clamp members as well.

The purpose of employing "Vice-Grip" type clamps is that they are adjustable and quickly releasable. Adjustment relates to the thickness of the part to be clamped, and quick release relates to operation of a depressible release lever. This invention employs state of the art adjustment, it being an object here to greatly improve the so-called quick release function. With the prior art clamps, release is a two-handed operation for the welder who normally grips or handles the clamp with a single hand and operates the release lever with the other hand. To this end I have provided a welder's clamp which can be held in one hand and quickly released by thumb pressure without changing his hand grip. It is also an object of this invention to provide an alternate mode of quick release which conveniently enables bumping of the release lever. This latter mode of release can be used when a solid object is present against which the release lever can be bumped, thereby releasing the toggle link of the clamp.

A safety protection feature is to coat the clamp structure with a dielectric insulation material, not shown herein as as to better reveal the clamp structure. The coating is applied coextensively to the exposed exterior to be handled by the welder.

The typical work piece to which a ground must be established is a plate or sheet of metal, or any part having thickness with opposite sides that can be gripped. It is usual for the side of a part to be parallel, but not necessarily so, and accordingly electrical contact over a relatively small area is to be preferred, since contact over a large area could be unstable due to surface imperfection and shifting of the clamp caused thereby. It is therefore an object of this invention to provide a local or small area of contact which will accept pressure applied to a single tooth or to a limited number of teeth, as may be required.

Locking pliers, commonly known as "Vice-Grips", are characterized by short heavy jaws that inflexibly grip themselves onto a work surface. The spacing of the jaws is adjusted so that a pre-set spacing thereof is attained, and to which the jaws are operated by means of a toggle lever system. However, this type of locking pliers is unyielding and the set position often becomes loose; in which case electrical continuity is lost when this type of pliers is used as a welder's clamp. Therefore, it is an object of this invention to provide resilient jaws that can be pre-set and nevertheless yield to stress and changing part conditions, so that clamping pressure is maintained and electrical continuity is never lost. In practice, the yielding function for maintaining gripping pressure is by means of lengthening the jaws, whereby resilience from the pliers fulcrum inherently provides continued pressure at the clamping jaws.

Heretofore, ground clamps of the type under consideration have been bulky and cumbersome. That is, the heft of the clamping pliers must be substantial and of considerable length, and from which a ground conductor must be extended; and all of which is constructed in one longitudinal alignment. This results in awkward situations when work space is cramped, and it is often difficult if not impossible to conveniently attach a ground to a work piece. Accordingly, it is an object of this invention to arrange the clamp jaws and teeth in such a manner that the welder has several choices in the placement and/or disposition of the grounding clamp. With the present invention there are terminal clamp teeth as well as laterally extended clamp teeth, and all of which are readily available through manipulation and without adjustment, as circumstances require. For example, the grounding clamp of the present invention can be applied to lie alongside a work piece rather than project therefrom, thereby saving space without encroachment into working space.

A typical rod electrode is a small diameter elongate cylindrical member that is clamped between diametrically opposed jaws operated by a handle and an acuating lever disposed one over the other when held in a natural hand gripping position. In said natural gripping position it is desirable that the welding rod, or "stinger", project downwardly from the clamp. Therefore, it is an object of this invention to provide clamp jaws by which this quick releasable clamp can be held in a natural upright position with the handle over the actuating lever, and with the welding rod projecting downwardly, or forwardly in a normal manner.

Electric welding requires the use of heavy conductors in order to carry the high voltages and current rates involved. For example, a typical grounding or power cable is ⅝ inch diameter, made up of a multiplicity of conductor wires covered by an insulating sheath, short sections thereof being substantially inflexible. End terminals are usually soldered thereto and tend to fracture the wire conductors, since such terminals are tightly secured with screw fasteners or the like so as to be rigid with the frame of the clamp. Therefore, turning and twisting of the cable and state of the art clamps has resulted in damage to the ground conductor wires at their joinder to the clamp frame by the end terminal, it being an object of this invention to guide as well as to anchor the short section of cable immediate to the said end fitting attachment to the clamp frame. With the present invention, stress is removed from the end terminal so that the electrical connection thereof to the clamp frame remains tight.

SUMMARY OF THE INVENTION

This invention advantageously utilizes the locking pliers principle in a quick releasable clamp for welding. This is accomplished in a ground clamp by extending the clamp jaws from the fulcrum about which they operate to grip a work piece. And, this is accomplished in a rod, or "stinger", clamp by turning the uppermost clamp jaw downwardly over the end of the lowermost clamp jaw; in the configuration of an overbite. A tight connection for electrical continuity is of prime concern, and to this end the resiliency of the clamp jaws at their adjusted clamping position is advantageously utilized to prevent looseness. In the ground embodiment it is the terminal end of each clamping member which has a gripping tooth for pressured engagement into the work piece, and a feature is the lateral extension of the clamp jaws at the terminal end of each clamping member for manipulation of the clamp into positions otherwise unobtainable. The release lever is exposed for thumb operation by a single hand gripping the clamp, and provision is made for bumping the release lever for its quick operation. The cable or conductor is guided and is anchored to the frame of the clamp in a manner to protect the terminal end portion of the conductor at the point of connection. And, releasable adjustment is provided for adapting the clamp to a wide variety of work pieces, all as circumstance require.

The foregoing and various other objects and features of this invention will be apparent and fully understood from the following detailed description of the typical preferred forms and applications thereof, throughout which description reference is made to the accompanying drawings.

THE DRAWINGS

FIG. 1 is a perspective view of the quick releasable clamp for welding that I have provided, with the jaws thereof released.

FIG. 2 is an enlarged fragmentary view taken as indicated by line 2—2 on FIG. 1.

FIG. 3 is an enlarged front view of the jaws engaged with a typical work piece and taken as indicated by line 3—3 on FIG. 1.

FIG. 4 is an enlarged sectional view taken as indicated by line 4—4 on FIG. 1.

FIG. 5 is a perspective view of modified jaws applied to the clamp as shown in FIG. 1.

FIG. 6 is a view of the actuator lever and release lever removed from the clamp assembly.

FIG. 7 shows a second embodiment for holding a rod, or "stinger", with the jaws released.

FIG. 8 is a fragmentary view of a portion of FIG. 7 showing the jaws tightened to hold a rod, or "stinger".

And, FIG. 9 is a view taken as indicated by line 9—9 on FIG. 8, showing clamped engagement of the rod.

PREFERRED EMBODIMENT

Referring now to the drawings, this welder's ground and rod clamp is essentially a toggle operated clamp that is attached to the end terminal of a cable or electrical conductor, and which is adjusted and releasably secured to a work piece W or to a welding rod R. A feature of its securement to a work piece W or onto a welding rod R is that the teeth or jaws thereof are releasably urged into adjusted engagement therewith respectively. The characteristic feature of the clamp is its release lever L that is accessible to the thumb of the welder's hand by which the clamp is gripped for manipulation. Another feature is the remote placement of the securement teeth and/or jaws from the fulcrum of the clamping members in the ground embodiment, whereby resiliency thereof is advantageously employed to maintain electrical continuity, by virtue of an inherently reliable mechanical connection.

As shown, this clamp includes a frame F that carries a first and fixed jaw J1 and an anchor coupling K to which the cable or conductor C is connected, a second movable jaw J2 pivoted to the frame, and an actuating lever A operable through a toggle link T backed by an adjustment means M to position the operable jaw J2 with respect to the fixed jaw J1, the two jaws being capable of being resiliently set with respect to each other in the ground embodiment of FIGS. 1-5.

A feature of the ground embodiment is the elongation of the lever arms which carry the jaws J1 and J2 with opposed teeth restricted to the terminal end portions of the arms, whereby resilience of the arms is a factor in establishing a reliable connection with the assurance of electrical continuity. Another feature of this ground embodiment is the lateral projection of the jaws at the ends of said arms, whereby manipulation of the clamp into a most advantageous position is made possible. The second embodiment of FIGS. 7-9 employs the same clamp and release features as those of the first embodiment, having jaws J3 and J4 characterized by an overbite engagement onto the rod R. The rod R, when engaged between the clamp jaws J3 and J4 projects downward as shown in FIG. 8, when the clamp as a unit is upright as shown in FIGS. 7 and 8. Still another feature is the anchor coupling K for the cable conductor C which is in alignment with the frame F.

The frame F is an elongated member disposed about a transverse horizontally disposed pivot 10 on an axis a, and having a rearwardly disposed handle portion 11, and a forwardly disposed lever arm 12 that carried the jaw J1 at its forward terminal end portion. In practice, the handle portion 11 is of inverted U-shape cross section with sides through which the pivot 10 bears; a handle approximately six inches in length. In the first embodiment, lever arm 12 is of slender tapered configuration and measurably resilient in its approximate five inch length. The lever arm 12 can be of any suitable cross section, and is essentially a very stiff and rugged spring, preferably made of steel.

The jaw J2 is carried by the pivot 10 and is in the form of a lever arm 13 that is complementary to and underlies the lever arm 12. In the first embodiment the lever arms 12 and 14 are of slender tapered configuration and measurably resilient. The lever arm 13 can be of any suitable cross section and is also essentially a very stiff and rugged spring, preferably made of steel. The two lever arms 12 and 13 on the common pivot 10 and axis a form a pincer or pliers adapted to have a yielding clamp action as will be described.

The lever arm 13 is a first class lever of bell crank configuration, having a pull pin 14 on an axis b spaced from and below the pivot 10 and axis a, the moment arm between axis a and b being one and one half inches, the lever arms 12 and 13 being five inches; a mechanical advantage of three and one third to one. An actuating lever A is carried by the pull pin 14 on axis b, and is in the form of a finger that coextensively and closely underlies the handle portion 11 of the frame F when operated to close the jaw J2 adjacent the jaw J1. A tension spring 15 extends between the frame F and lever arm 13 to gently open the jaws.

A toggle link T in the form of a strut member articulates from an axis c and is suitably positioned by an adjustment means M. As shown, the means M is a screw threadedly engaged through the rear portion of the handle 11 with its forward end forming an abutment to oppose the free end portion of the link T. According to the state of the art pliers of this type, the toggle link T is pivoted to the articulating lever A by a push pin 16 that moves slightly over-center when the lever A is operated into a position that forceably closes the jaws.

A release lever L is provided on the lever A to break the above described over-center condition with facility, and in accordance with this invention said release lever L is operable by either thumb pressure or by bumping. As shown, the release lever L is a first class lever exposed at the exterior of the clamp assembly for both manual and bumping operation. Release lever L is pivoted by a pin 17 carried by the actuating lever A beneath the link T, so as to be engageable therewith. And, release lever L is characterized by a forwardly extending lever arm 18 that lies alongside the lever A and terminates in the vacinity of the pivot pin 10 and axis a, where it is accessible to the thumb of the welder's gripping hand. The release lever L is also characterized by a rearwardly extending lever arm 19 that lies under link T so as to engage and lift the same when release of the clamp is desired. In practice, the actuating lever A is U-shaped in cross section so as to receive the link T between its upstanding sides, in which case the lever arm 19 of release lever L enters through an opening 30 in the bottom side of the lever A, so as to engage the link T disposed within the sides of the lever A. The link T is provided with a boss 31 that is engaged by lever arm 19 to lift the link for release.

Manual engagement of the release lever L is by means of a lateral projecting thumb pad 32 at the front end of the lever arm 18, to depress the release lever L for lifting engagement of lever arm 19 with the boss 31 of link T. Bumping engagement of the release lever L is by means of forceful engagement with a depending lug 33 that projects from the rearmost end of the lever arm 19, to lift the lever arm 19 and thereby lift the boss 31 and link T. The release lever L is held retracted from the link boss 31 by means of a spring 34 surrounding and positioned by pin 17.

Referring now to the first embodiment of FIGS. 1-5, the jaws J1 and J2 are positioned in spaced opposition to each other by the lever system hereinabove described. The lever arms 12 and 13 are extended so as to be resilient, and the jaws J1 and J2 are confined to the terminal end portions of the lever arms, as shown. Each of the jaws J1 and J2 is comprised of primary teeth 20 and 21 positioned to bite in opposition, one toward the other with a section of a work piece W therebetween (see FIG. 3). In practice, there are single primary teeth 20 and 21 disposed transversely at the terminal end of each lever arm. Accordingly, forceful pressure applied by the aforesaid toggle linkage burries the teeth 20 and 21 into the workpiece, subject to yielding pressure of the resilient lever arms 12 and 13. Consequently, the teeth 20 and 21 are forced through the application of spring pressure having stored up potential energy in reserve to maintain pressure contact and electrical continuity.

In accordance with this invention, the jaws J1 and J2 of the first embodiment are also comprised of laterally extending secondary teeth 22 and 23 positioned to bite in opposition with a section of a work piece W therebetween. In practice, there can be several secondary teeth 22 and 23 in opposition, as shown in FIG. 5, however I have shown single secondary teeth in FIGS. 1-3 offset to the side of each lever arm 12 and 13, and disposed parallel thereto in opposition to each other. Accordingly, forceful pressure applied to the aforesaid toggle linkage burries the teeth 22 and 23 into the work piece, subject to yielding pressure of the resilient lever arms 12 and 13, as above described. Note the right angular relationship of the primary and secondary teeth, the teeth 20 and 21 extending beyond the sides of the lever arms 12 and 13. Thus, one or both sets of teeth can be engaged with the work piece W.

Referring now to the second embodiment of FIGS. 7-9, the jaws J3 and J4 are positioned in spaced opposition to each other by the lever system hereinabove described. The lever arms 12' and 13' are close coupled to pivot pin 10 and axis a so as to be firm and rugged, and jaws J3 and J4 are confined to the terminal end portions of the lever arms, as shown. Each of the jaws J3 and J4 is comprised of a groove, grooves 35 and 36 that receive and position the butt end portion of rod R, as clearly shown in FIGS. 8 and 9. A feature of this embodiment is that the grooves 35 and 36 are disposed in a plane normal to the forward extension of lever arms 12' and 13', whereby the axis of rod R is downwardly disposed and normal to the disposition of frame F and its handle protion 11. Accordingly, jaw J4 has an outwardly disposed face 38 with groove 36 to oppose the jaw J3 which has an inwardly disposed face 37 with groove 35. As shown, the faces 37 and 38 remain spaced when the rod R is engaged in the grooves 35 and 36. The faces 37 and 38 swing together as indicated by the arrows in FIGS. 7 and 8, so as to have a wedging action against the rod R, which substantially augments the force applied by the toggle action of the clamp system hereinabove described.

In accordance with this invention, the anchor coupling K mechanically and electrically connects the cable or conductor C to the frame F. The cable C is comprised of a multiplicity of wires enclosed within a durable insulating sheath, there being a terminal fitting 25 sweated onto or otherwise secured to the end of the conductor to be coupled to the frame F. Accordingly, an ear 26 projects integrally from the frame F and has an opening therethrough to receive a screw fastener 27 for electrical securement of the terminal fitting 25, thereby electrically connecting the cable C and the frame F, for electrical continuity directly to the teeth or groove, as the case may be.

Mechanical anchorage independent of the electrical connection is by means of a C-shaped channel 28 integral with the frame F and in alignment with the electrical connection to the ear 26. The channel 28 opens to receive and freely pass the enlargement of the fitting 25, as that cable can be inserted into anchored position without removing said fitting. A set screw 29 threaded through one side of the channel 28 burries itself into a side of the cable C to anchor the same. Thus, the cable C is readily attached mechanically and electrically to the frame F, and is also easily removed therefrom.

From the foregoing, it will be apparent that I have provided a new and useful welder's ground and rod clamp that is quickly releasable by means of thumb pressure applied by the one hand used for manipulation. In the first embodiment use of this clamp, it yieldingly burries the grounding teeth into the work piece, and is characterized by extended resilient lever arms that store potential energy for continued clamping action. It will be observed from FIG. 3 that the jaw teeth burry themselves into the work piece, and that several right angularly related jaw teeth engage into the work piece at the end of the lever arms. In the second embodiment use of this clamp, it forceably secures the butt end of the welding rod. And it will be observed that the cable C bends away from the clamp remote from the terminal fitting 25, without damaging affect on the electrical connection.

Having described only the typical preferred forms and applications of my invention, I do not wish to be limited or restricted to the specific details herein set forth, but wish to reserve to myself any modifications or variations that may appear to those skilled in the art, as set forth within the limits of the following claims.

I claim:

1. A quick releasable welder's clamp for mechanical engagement onto and electrical continuity into a work piece or rod, and including;
   an elongated frame disposed about a transverse pivot and axis and comprised of a handle portion extending rearwardly and a lever arm extending forwardly,
   an actuating lever carried by the pivot and extending rearwardly therefrom and complementary to and underlying the handle portion of the frame and from which a lever arm extends forwardly and complementry to and underlying the lever arm of the frame,
   a toggle link adapted to be releasably set by adjustment means in an adjusted over-center position and operable between the handle portion of the frame and the actuating lever to force the two arms into spaced relationship,
   a release lever carried by a pivot on the actuating lever and having a lever arm extending forwardly with a pad at the exterior of the frame for manual depression and having a lever arm extending rearwardly and engageable beneath the toggle link to lift the same from said over-center position,
   and opposed jaws carried by the complementary lever arms at the ends thereof remote from the pivot and axis for pressured engagement with opposite sides of a work piece or rod placed therebetween,
   there being an anchor coupling means mechanically and electrically connecting an electric cable to the frame.

2. The quick releasable welder's clamp as set forth in claim 1, wherein the forwardly extending lever arm of the release lever lies alongside of the actuating lever.

3. The quick releasable welder's clamp as set forth in claim 1, wherein the forwardly extending lever arm of the release lever lies alongside of the actuating lever and frame.

4. The quick releasable welder's clamp as set forth in claim 1, wherein the pad of the release lever is positioned thereby in the vicinity of the transverse pivot and axis.

5. The quick releasable welder's clamp as set forth in claim 1, wherein the forwardly extending lever arm of the release lever lies alongside of the actuating lever and frame, and wherein the pad of the release lever is positioned thereby in the vicinity of the transverse pivot and axis.

6. The quick releasable welder's clamp as set forth in claim 1, wherein the actuating lever is of U-shaped cross section embracing the toggle link and with a bottom opening to pass the rearwardly extending lever arm of the release lever for its engagement beneath said toggle link.

7. The quick releasable welder's clamp as set forth in claim 1, wherein the forwardly extending lever arm of the release lever lies alongside of the actuating lever and frame and the pad of the release lever carried thereby for access in the vicinity of the transvere pivot and axis, and wherein the actuating lever is of U-shaped cross section embracing the toggle link and with a bottom opening to pass the rearwardly extending lever arm of the release lever for its engagement beneath said toggle link.

8. The quick releasable welder's clamp as set forth in claim 1, wherein the lever arm of the frame and the lever arm extending from the actuating lever are elongated and at least one of which is stiff spring exerting clamping pressure with reserve potential.

9. The quick releasable welder's clamp as set forth in claim 8, wherein the opposed jaws have teeth adapted to be buried into a work piece when under pressure exerted by the at least one lever arm.

10. The quick releasable welder's clamp as set forth in claim 8, wherein at least one of the opposed jaws has a single tooth to be buried into a work piece when under pressure by said at least one lever arm.

11. The quick releasable welder's clamp as set forth in claim 8, wherein the at least one of the opposed jaws has a single transverse tooth adapted to be buried into a work piece when under pressure exerted by said at least one lever arm.

12. The quick releasable welder's clamp as set forth in claim 8, wherein each of the opposed jaws has a toothed portion laterally offset to one side of the lever arms and adapted to be buried into a work piece when under pressure exerted by said at least one lever arm.

13. The quick releasable welder's clamp as set forth in claim 8, wherein each of the opposed jaws has a single longitudinally disposed tooth laterally offset to one side of the lever arms and adapted to be buried into a work piece when under pressure exerted by said at least one lever arm.

14. The quick releasable welder's clamp as set forth in claim 8, wherein each of the opposed jaws has a single transverse tooth adapted to be buried into a work piece, and wherein each of the opposed jaws has a single longitudinally disposed tooth laterally offset to one side of the lever arms and adapted to be burried into said work piece.

15. The quick releasable welder's clamp as set forth in claim 1, wherein the lever arm of the frame and the lever arm extending from the actuating lever carries the opposed jaws in an overbite relationship to wedge a rod disposed therebetween and substantially normal to the disposition of the frame and its handle portion.

16. The quick releasable welder's clamp as set forth in claim 15, wherein the jaw carried by the lever arm extending from the actuating lever has an outwardly disposed face opposed by an overlying inwardly disposed face of the jaw carried by the lever arm of the frame.

17. The quick releasable welder's clamp as set forth in claim 16, wherein the face of at least one jaw has a groove to receive and position the rod in said disposition substantially normal to the disposition of the frame and its handle portion.

18. The quick releasable welder's clamp as set forth in claim 16, wherein the faces of the jaws have complementary grooves to receive and position the rod in said disposition substantially normal to the disposition of the frame and its handle portion.

19. The quick releasable welder's clamp as set forth in claim 1, wherein the anchor coupling means is comprised of an ear integral with and projecting from the handle portion of the frame to receive a cable terminal fitting for electrically continuity, and a C-shaped channel guide in alignment with the ear to receive the extending cable and to pass the terminal fitting inserted therethrough.

20. The quick releasable welder's clamp as set forth in claim 19, wherein a set screw threaded into the C-shaped channel guide anchors the ground conductor.

* * * * *